(12) United States Patent
Lu et al.

(10) Patent No.: US 11,120,321 B2
(45) Date of Patent: Sep. 14, 2021

(54) VISUAL CARD AND OPERATING METHOD FOR SAME

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 216 days.

(21) Appl. No.: 16/374,702

(22) Filed: Apr. 3, 2019

(65) Prior Publication Data

US 2019/0228281 A1 Jul. 25, 2019

Related U.S. Application Data

(63) Continuation of application No. PCT/CN2018/080528, filed on Mar. 26, 2018.

(30) Foreign Application Priority Data

Apr. 25, 2017 (CN) .......................... 201710277450.9

(51) Int. Cl.
  *G06K 19/077* (2006.01)
  *G06K 19/07* (2006.01)

(52) U.S. Cl.
  CPC ... *G06K 19/07707* (2013.01); *G06K 19/0702* (2013.01)

(58) Field of Classification Search
  CPC .................. G06K 19/0702; G06K 19/07707
  See application file for complete search history.

(56) References Cited

U.S. PATENT DOCUMENTS

2006/0118638 A1* 6/2006 Odake ................ G06K 19/0701
  235/492

FOREIGN PATENT DOCUMENTS

| CN | 102073888 A | 5/2011 |
| CN | 201965648 U | 9/2011 |
| CN | 102867210 A | 1/2013 |
| CN | 203552291 U | 4/2014 |
| CN | 104156756 A | 11/2014 |

(Continued)

OTHER PUBLICATIONS

The International Search Report of corresponding International application No. PCT/CN2018/080528, dated Jul. 4, 2018.

(Continued)

*Primary Examiner* — Laura A Gudorf
(74) *Attorney, Agent, or Firm* — J.C. Patents

(57) ABSTRACT

The present disclosure relates to the field of communications and, particularly to a visual card and an operating method for the visual card; the visual card includes a main control module, an antenna module, a power management module, a displaying module and a signal converting module; the main control module is connected to all of the antenna module, the power management module, the displaying module and the signal converting module, the signal converting module is connected to the antenna module; the main control module is configured to communicate with an external card read device via the antenna module, update and store key information; the main control module is further configured to monitor an exit signal according to an electronic signal input by the signal converting module.

10 Claims, 12 Drawing Sheets

(56) References Cited

FOREIGN PATENT DOCUMENTS

CN    104218690 A    12/2014
CN    107025483 A    8/2017

OTHER PUBLICATIONS

The Chinese First Examination Report, including search report of corresponding Chinese application No. 201710277450.9, dated Jan. 9, 2018.
The Chinese Second Examination Report, including search report of corresponding Chinese application No. 201710277450.9, dated Mar. 6, 2018.
The Chinese Third Examination Report, including search report of corresponding Chinese application No. 201710277450.9, dated Apr. 13, 2018.
The Chinese Fourth Examination Report of corresponding Chinese application No. 201710277450.9, dated Jun. 12, 2018.

\* cited by examiner

VISUAL CARD AND OPERATING METHOD FOR SAME

CROSS-REFERENCE TO RELATED APPLICATIONS

This application is a continuation of the International Application No. PCT/CN2018/080528, filed on Mar. 26, 2018, which claims priority to Chinese application 201710277450.9, filed with the Chinese Patent Office on Apr. 25, 2017, the contents of both applications are hereby incorporated by reference in their entireties.

TECHNICAL FIELD

The present disclosure relates to the field of communications and, particularly, to a visual card and an operating method for the visual card.

BACKGROUND

An IC card is also known as integrated circuit card, due to its portability and large storage, the IC card is applied to many fields, such as finance, telecommunications, transportation, security management and personal identity verification. In prior art, the IC card has a large storage for consummation information and user information; and the card can display these information after a displaying technology, such as e-paper, is applied thereon, the information which can be displayed in the card may include key information, such as e-cash balance, transaction details and data defined by an issuer.

Nonetheless, the IC card can display information only when being in a magnet field, which means that the IC card can display information only when being swiped, once the IC card is taken away from the magnet field, no information would be displayed thereon, thereby rendering it inconvenient for users. Therefore, the problem urgent to be solved may be to provide a method and an apparatus for continually displaying contents after the IC card is out of the field.

SUMMARY

The present disclosure provides a visual card and an operating method for the visual card, so as to solve the problem that the IC card cannot continue displaying information after the card is out of the field.

The present disclosure provides a visual card, which includes a main control module, an antenna module, a power management module, a displaying module and a signal converting module;

the main control module is connected to all of the antenna module, the power management module, the displaying module and the signal converting module; the signal converting module is connected to the antenna module;

the main control module is configured to communicate with an external card read device via the antenna module, update and store key information; the main control module is further configured to monitor an exit signal according to an electronic signal input by the signal converting module; the main control module is further configured to obtain the key information when the exit signal is monitored, and make the displaying module display the key information; the antenna module is configured to be in mutual induction with the external card read device; the signal converting module is configured to convert the electronic signal generated from the mutual induction of the antenna module, and transmit the converted electronic signal to the main control module; the power management module is configured to supply power for the main control module.

Specifically, the power management module is a battery.

Specifically, where the signal converting module is connected to the main control module, specifically, connected to a test Input/Output (I/O) of a main control chip; where the power management module is connected to the main control module, specifically, connected to a Volt Current Condenser (VCC) pin of the main control chip.

Optionally, the signal converting module is also connected to the power management module, and the electronic signal converted by the signal converting module supplies power for the power management module. Specifically, the power management module is a super capacitor.

Optionally, the visual card further includes a current limiting module which lies between the signal converting module and the power management module.

Specifically, the main control module includes: a control unit, a transaction integrated circuit (IC) chip and a switching unit;

The control unit is connected to all of the transaction IC chip, the switching unit, the power management module, the displaying module and the signal converting module; the control unit is configured to monitor the exit signal according to the electronic signal input by the signal converting module; the control unit is further configured to make the switching unit conductive when the exit signal is monitored so that the power management module supplies power for the transaction IC chip; the control unit is further configured to obtain the key information from the transaction IC chip when the exit signal is monitored, and make the displaying module display the key information, and the power management module supplies power for the control unit;

the transaction IC chip, being further connected to the antenna module, is configured to communicate with the external card read device, update and store the key information;

the switching unit is further connected to the transaction IC chip and the power management module, and the power management module supplies power for the transaction IC chip when the switching unit becomes conductive.

The control unit specifically includes a main control chip, an oscillating circuit, a reset circuit and a peripheral circuit;

specifically, the main control chip is connected to all of the transaction IC chip, the switching unit, the power management module, the displaying module, the signal converting module, the oscillating circuit, the reset circuit and the peripheral circuit.

More specifically, the signal converting module is connected to the main control module, specifically, connected to the test IO of the main control chip; the power management module is connected to the main control module, specifically, connected to the VCC pin of the main control chip.

The main control module is configured to monitor the exit signal according to the electronic signal input by the signal converting module, specifically, configured to monitor the exit signal by monitoring a level change of the test IO.

Preferably, the visual card includes a first voltage stabilizing circuit, where the first voltage stabilizing circuit lies between the switching unit and the transaction IC chip, or between the switching unit and the power management module.

Specifically, the signal conversion circuit includes a rectifying circuit and a second voltage stabilizing circuit; where the rectifying circuit is connected to the antenna module and the second voltage circuit, the second voltage stabilizing circuit is connected to the main control module.

Specifically, the displaying module is an E-paper; the E-paper is connected to both of the power management module and the main control module when the E-paper is equipped with no drive IC; while the E-paper is connected to the main control module when the E-paper is equipped with a drive IC.

The present disclosure also provides an operating method for a visual card, which includes:

step 101: initializing, by the visual card, and building a connection with an external card read device;

step 102: determining, by the visual card, whether there is an exit signal, if yes, proceeding to step 104; otherwise, proceeding to step 103 when the visual card receives an operation instruction;

step 102 specifically includes: determining, by the visual card, whether a level of a test IO is at a low level, if yes, it is determined that the exit signal is monitored by the visual card; otherwise, it is determined that the exit signal is not monitored by the visual card;

step 103: executing, by the visual card, a corresponding operation according to the operation instruction to obtain an operational result, updating key information according to the operational result, and returning the operational result to the external card read device; and returning to step 102;

step 104: obtaining and displaying, by the visual card, the key information.

When the visual card includes a control unit and a transaction IC chip, where the obtaining, by the visual card, the key information specifically includes:

step 201: sending, by the control unit, an applet choosing instruction to the transaction IC chip, and receiving response data returned from the transaction IC chip;

step 202: determining, by the control unit, whether an applet is chosen successfully according to the response data, if yes, proceeding to step 203; otherwise, reporting an error;

step 203: obtaining, by the control unit, the key information from the transaction IC chip.

Preferably, before step 201, the method further includes:

step 301: sending, by the control unit, a reset signal to the transaction IC chip, proceeding to step 302 when a reset response returned from the transaction IC chip is received;

step 302: determining, by the control unit, whether the IC chip is reset successfully according to the reset response, if yes, proceeding to step 201; otherwise, reporting an error;

step 302 specifically includes: determining, by the control unit, whether a preset byte of the reset response is a preset value, if yes, determining that the transaction IC chip is reset successfully; otherwise, determining that the transaction IC chip is reset unsuccessfully.

The present disclosure not only realizes functions of data processing and data displaying of the visual card, but enables the card to continue displaying information after the card is out of the field, thereby making the visual card more convenient for a user.

BRIEF DESCRIPTION OF THE DRAWINGS

In order to make technical solutions in embodiments of the present application or the prior art clearer, accompanying drawings used in the description of the embodiments or the prior art will be briefly described hereunder. Obviously, the described drawings are merely some embodiments of present application. For persons skilled in the art, other drawings may be obtained based on these drawings without any creative effort.

DESCRIPTION OF EMBODIMENTS

The technical solutions in the embodiments of the present application will be described hereunder clearly and completely with reference to the accompanying drawings in the embodiments of the present application. Obviously, the described embodiments are only a part of embodiments of the present application, rather than all embodiments of the present application. All other embodiments obtained by persons of ordinary skill in the art based on the embodiments of the present application without any creative effort should fall into the protection scope of the present application. Besides, all the following embodiments are optional solutions of the present disclosure, the arrangement order and numbers of these embodiments are irrelevant to the preferable executing sequences thereof.

Embodiment 1

Figure 1:
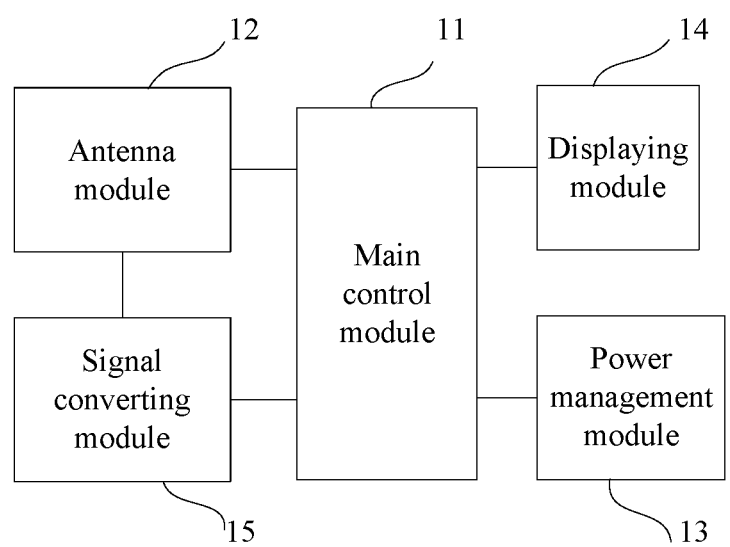
FIG. 1 shows a block diagram of a visual card according to Embodiment 1 of the present disclosure.

This embodiment provides a visual card, as shown in FIG. 1, the visual card includes a main control module 11, an antenna module 12, a power management module 13, a displaying module 14 and a signal converting module 15. The main control module 11 is connected to all of the antenna module 12, the power management module 13, the displaying module 14 and the signal converting module 15; and the antenna module 12 is further connected to the signal converting module 15.

The main control module 11 is configured to communicate with an external card read device via the antenna module, update and store key information; the main control module 11 is further configured to monitor an exit signal according to an electronic signal input by the signal converting module 15; the main control module 11 is further configured to obtain the key information when the exit signal is monitored and make the displaying module 14 display the information.

The antenna module 12 is configured to realize communication between the main control module 11 and the external card read device; the antenna module 12 is further configured to generate an electronic signal from mutual induction with the external card read device.

The power management module 13 is configured to supply power for the main control module 11; the power management module is specifically a battery.

The displaying module 14 is configured to display the key information obtained by the main control module 11; preferably, the displaying module 14 is specifically an E-paper.

It should be noted that the E-paper needs to be connected to the power management module 13, which is also configured to supply power for the E-paper, when the E-paper is equipped with no drive IC.

The signal converting module 15 is configured to convert the electronic signal generated by the antenna module 12, and transfer the converted electronic signal to the main control module 11; when the visual card is in the field, the signal converting module 15 outputs an electronic signal, which means that the main control module 11 monitors a high level; when the visual card is not in the field, the signal converting module 15 does not output any electronic signal, which means that the main control module 11 monitors a low level.

Figure 2:
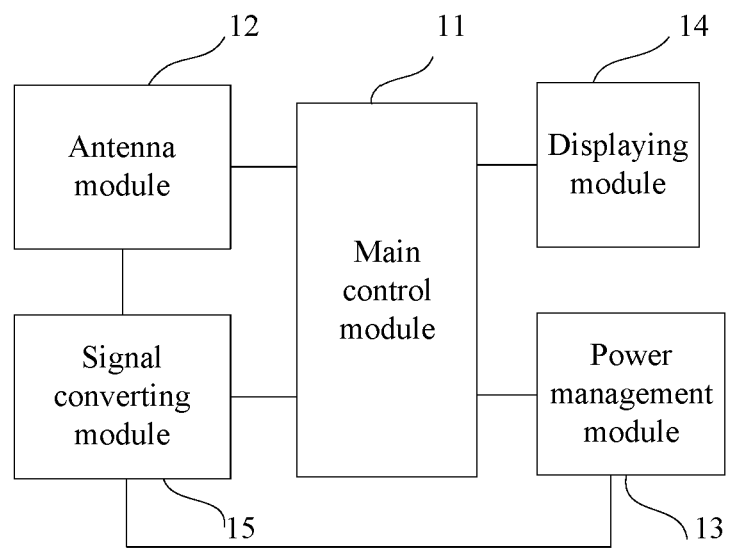
FIG. 2 shows another block diagram of a visual card according to Embodiment 1 of the present disclosure.

Optionally, as shown in FIG. 2, the power management module 13, which is further connected to the signal converting module 15, is configured to store the converted electronic signal obtained by the signal converting module 15, and is also configured to supply power for the main control module 11; the power management module 13 is specifically a super capacitance.

Figure 3:
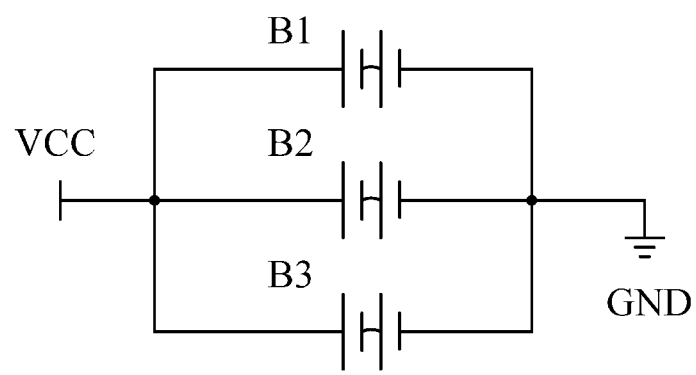
FIG. 3 shows a circuit diagram of a power management module according to Embodiment 1 of the present disclosure.

As shown in FIG. 3, the power management module 13 is specifically constituted of a super capacitance B1, a super capacitance B2 and a super capacitance B3 which are connected in parallel.

Figure 4:
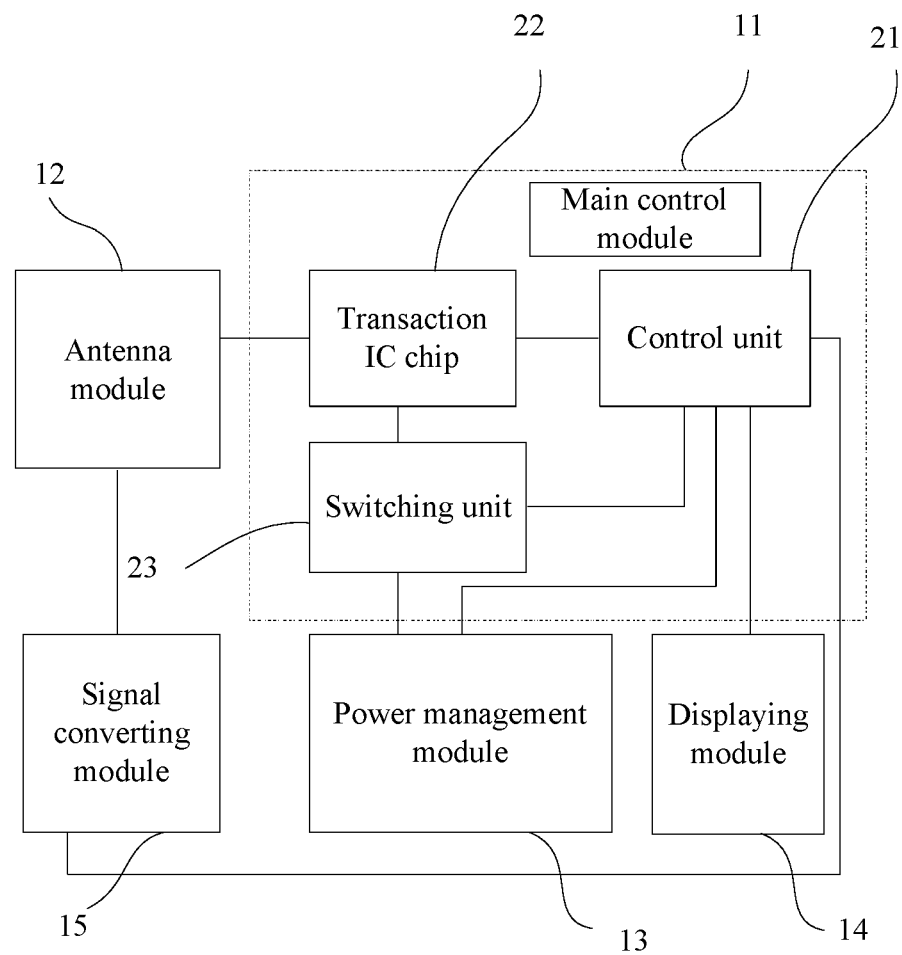
FIG. 4 shows a block diagram of a visual card according to Embodiment 1 of the present disclosure.

The main control module 11, as shown in FIG. 4, specifically includes a control unit 21, a transaction IC chip 22 and a switching unit 23; the control unit 21 is connected to all of the transaction IC chip 22, the switching unit 23, the power management module 13, the displaying module 14 and the signal converting module 15, the switching unit 23 is also connected to the transaction IC chip 22 and the power management module 13; the transaction IC chip 22 is also connected to the antenna module 12.

The control unit 21 is configured to monitor the exit signal according to the electronic signal input by the signal converting module 15, and is also configured to make the switching unit 23 conductive when the exit signal is monitored so that the power management module 13 supplies power for the transaction IC chip 22; the control unit 21 is also configured to obtain the key information from the transaction IC chip 22 when the exit signal is monitored, and make the displaying module 14 display the key information obtained from the transaction IC chip 22; the transaction IC chip 22 communicates with the external card read device via the antenna module 12, updates and stores the key information.

The transaction IC chip 22 is connected to the antenna module 12, the control unit 21 and the switching unit 23, the transaction IC chip 22 communicates with the external card read device via the antenna module 12, updates and stores the key information.

Figure 5:
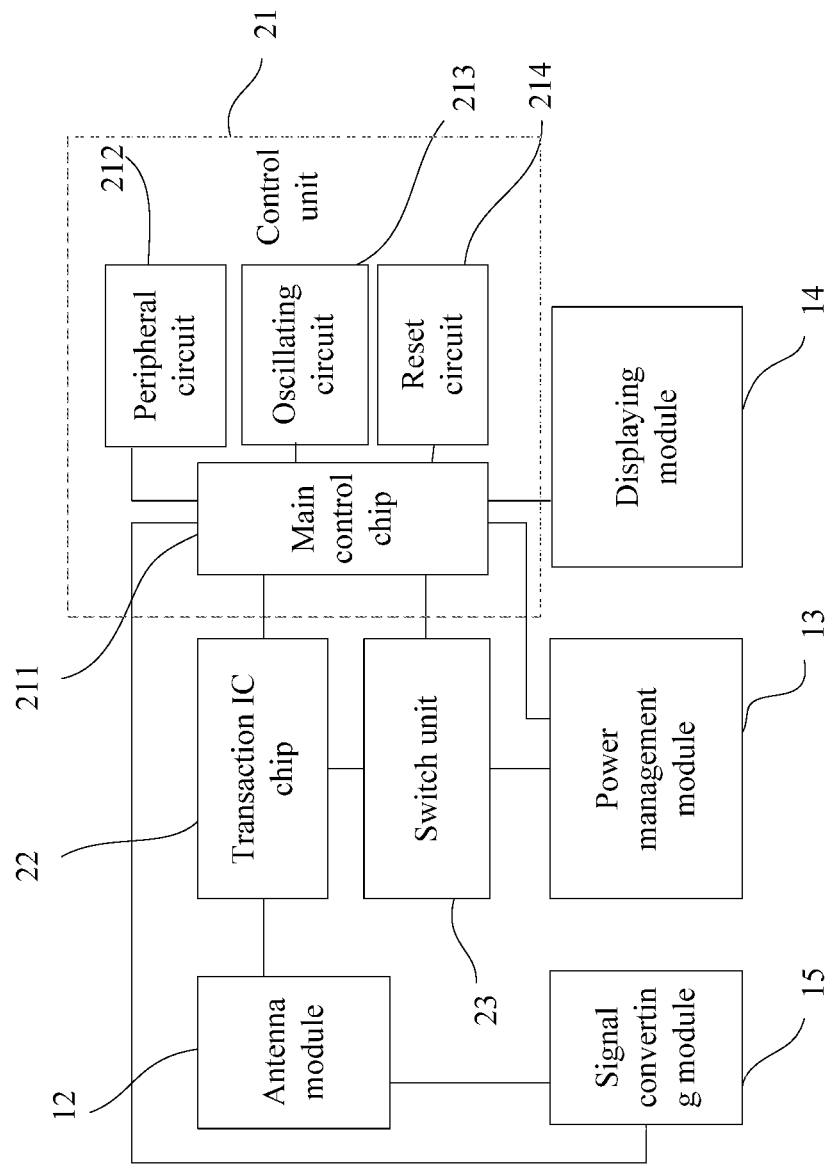
FIG. 5 shows a block diagram of a visual card according to Embodiment 1 of the present disclosure.

Furthermore, as shown in FIG. 5, the control unit 21 specifically includes a main control chip 211, a peripheral circuit 212, an oscillating circuit 213 and a reset circuit 214; the main control chip 211 is connected to all of the transaction IC chip 22, the switching unit 23, the power management module 13, the displaying module 14, the signal converting module 15, the peripheral circuit 212, the oscillating circuit 213 and the reset circuit 214.

It should be noted that the signal converting module 15 is connected to the main control module 11, specifically, connected to a test IO of the main control chip; the power management module 13 is connected to the main control module 11, specifically, connected to a VCC pin of the mater control chip.

Figure 6:
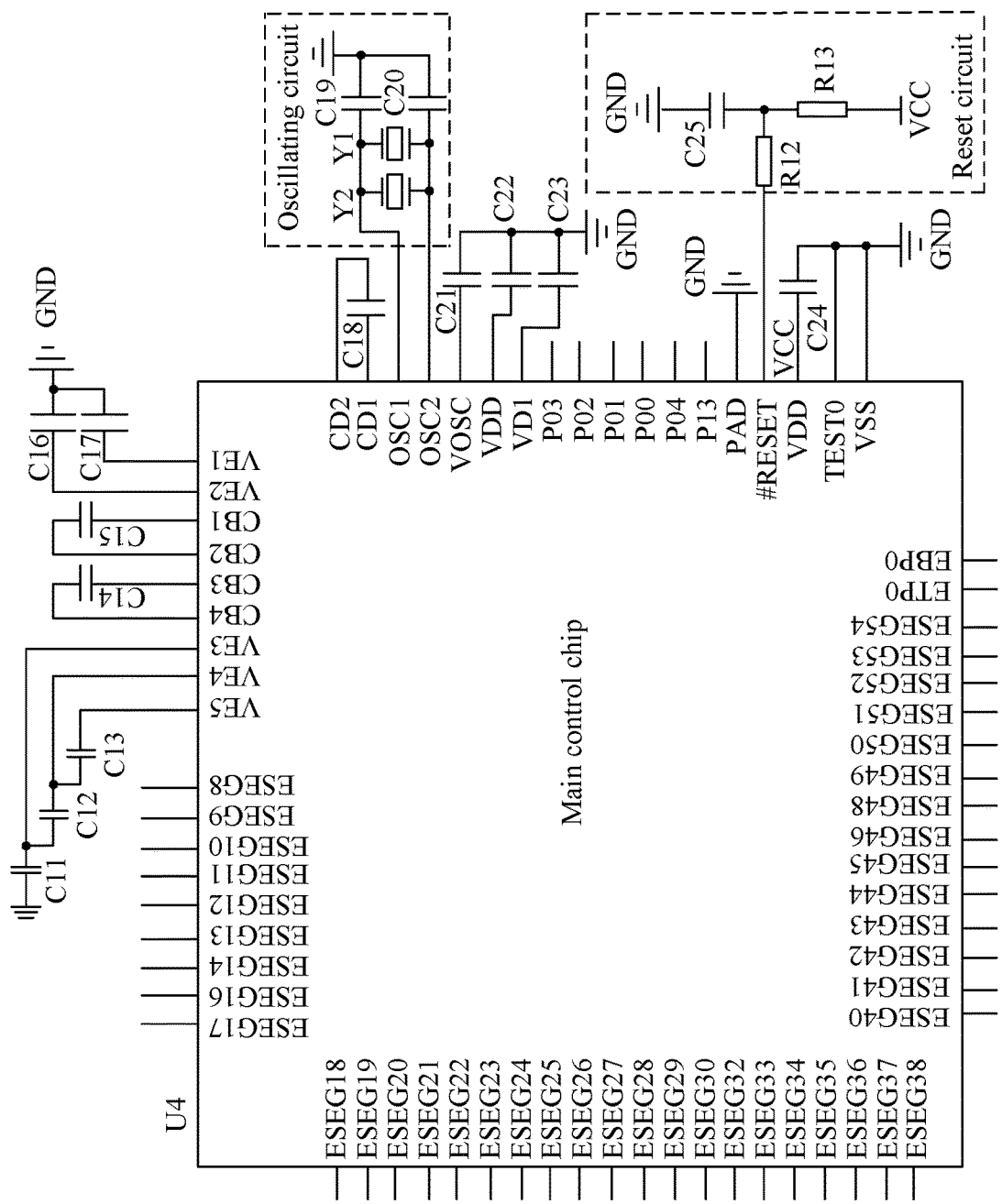
FIG. 6 shows a circuit diagram of a control unit according to Embodiment 1 of the present disclosure.

More specifically, as shown in FIG. 6, the main control chip 211 is specifically implemented with a chip U4.

It should be noted that the signal converting module 15 is connected to the main control module 11, specifically, connected to the test IO of the main control chip 211; specifically, the test IO in this embodiment is the P00 pin of the chip U4. When the visual card is in the field, the signal converting module 15 outputs the electronic signal, which means that the P00 pin of the chip U4 is at a high level; when the visual card is out of the field, the signal converting module 15 does not output any electronic signal, which means that the P00 pin of the chip U4 is at a low level.

The oscillating circuit 213 is specifically constituted of a crystal oscillator Y1, a crystal oscillator Y2, a capacitance C19 and a capacitance C20; in which, the crystal oscillator Y1 and the crystal oscillator Y2 are connected in parallel to each other, both ends of the crystal oscillator Y1 are connected to the ground respectively via the capacitance C19 and the capacitance C20; two ends of the crystal oscillator Y2 are respectively connected to the OCS1 pin and the OCS2 pin of the chip U4;

the reset circuit 214 specifically includes a resistance R12, a resistance R13 and a capacitance C25; one end of the resistance R12 is connected to the #RESET pin of the chip U4, the other end is connected to the ground via the capacitance C25; one end of the resistance R13 is connected to the output end VCC of the power management module, the other end is connected to the ground via the capacitance C25.

The peripheral circuit 212 specifically consists of a capacitance C11, a capacitance C12, a capacitance C13, a capacitance C14, a capacitance C15, a capacitance C16, a capacitance C17, a capacitance C 18, a capacitance C21, a capacitance C22, a capacitance C23 and a capacitance C24.

Figure 7:
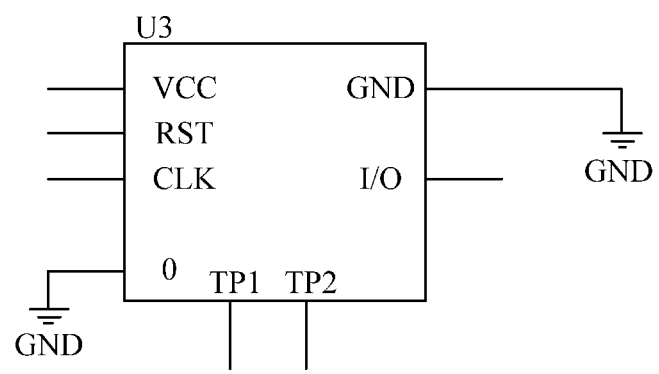
FIG. 7 shows a circuit diagram of a transaction IC chip according to Embodiment 1 of the present disclosure.

Furthermore, as shown in FIG. 7, the transaction IC chip 22 is specifically implemented with a chip U3; the RES pin, the CLK pin and the I/O pin of the chip U3 are respectively connected to the P03 pin, the P13 pin and the P04 pin of the chip U4. The chip U3 communicates with the chip U4 via the I/O pin.

Figure 8:
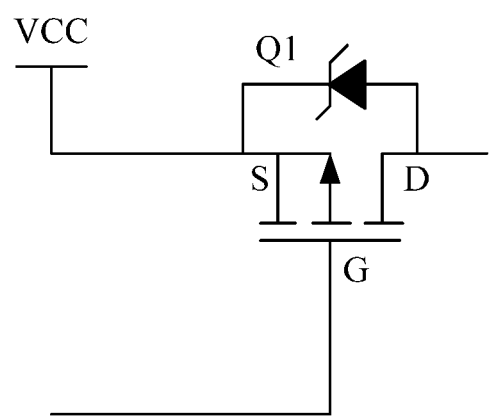
FIG. 8 shows a circuit diagram of a switching unit according to Embodiment 1 of the present disclosure.

As shown in FIG. 8, the switching unit 23 specifically includes a positive channel metal oxide semiconductor (PMOS) transistor Q1, and a source of the PMOS transistor Q1 is connected to the power management module 13; a grid of the PMOS transistor Q1 is connected to the P02 pin of the chip U4; a drain of the PMOS transistor Q1 is connected to the VCC pin of the chip U3.

Figure 9:
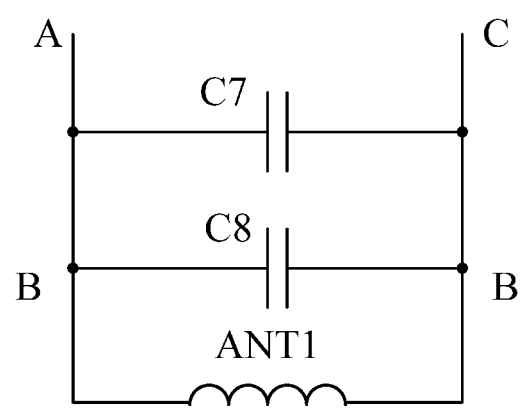
FIG. 9 shows a circuit diagram of an antenna module according to Embodiment 1 of the present disclosure.

As shown in FIG. 9, the antenna module 13 consists of a coil ANTI and a matching capacitance C7 and a matching capacitance C8 which are connected in parallel to the coil ANT 1; an A end and a C end of the antenna module are respectively connected to a TP1 pin and a TP2 pin of the chip U3.

Figure 10:
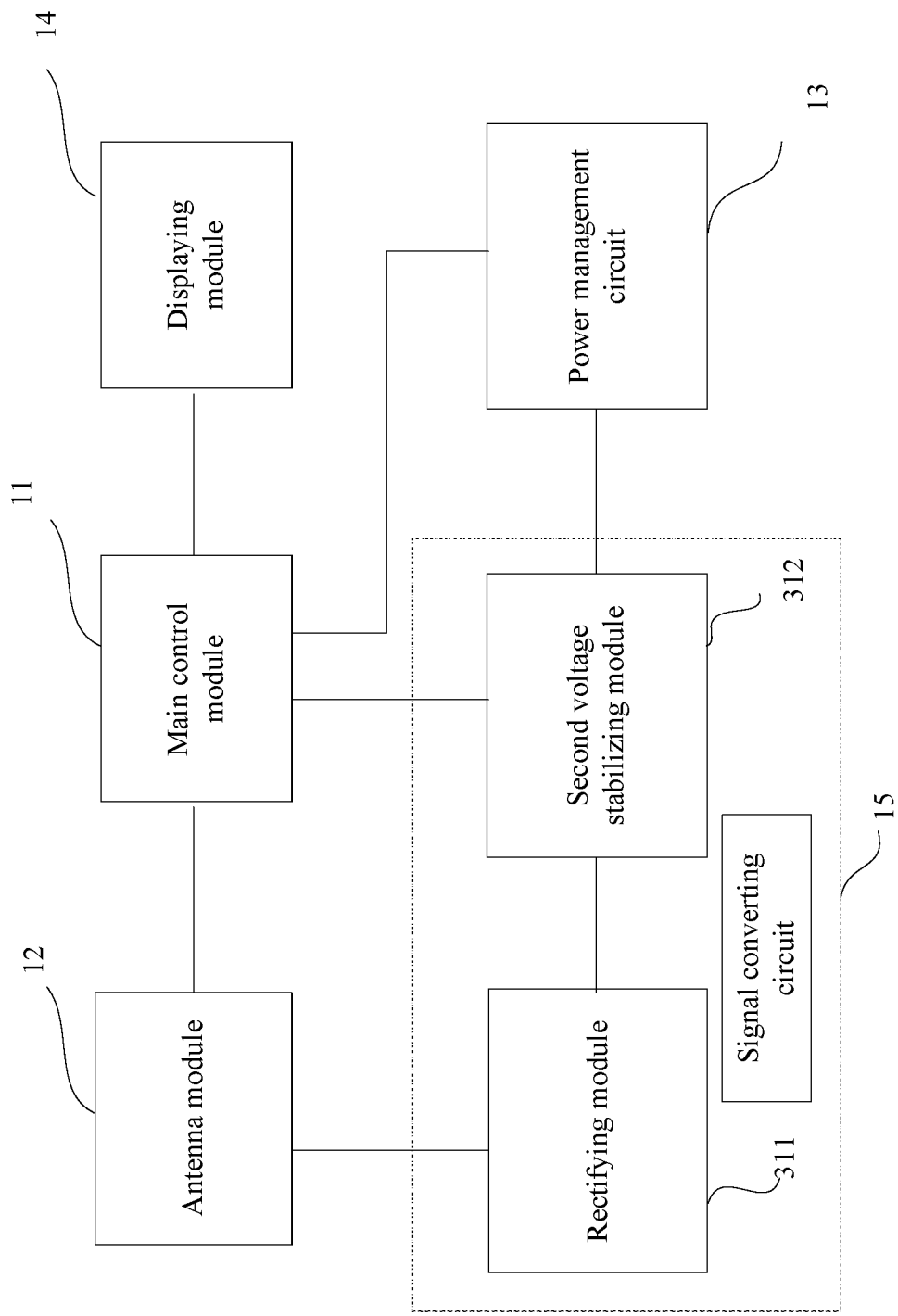
FIG. 10 shows a block diagram of a visual card according to Embodiment 1 of the present disclosure.

As shown in FIG. 10, the signal conversion circuit 15 specifically includes a rectifying circuit 311 and a second voltage stabilizing circuit 312, the rectifying circuit 311 is connected to the antenna module 12 and the second voltage stabilizing circuit 312, the second voltage stabilizing circuit 312 is connected to both of the main control module 11 and the power management module.

Figure 11:
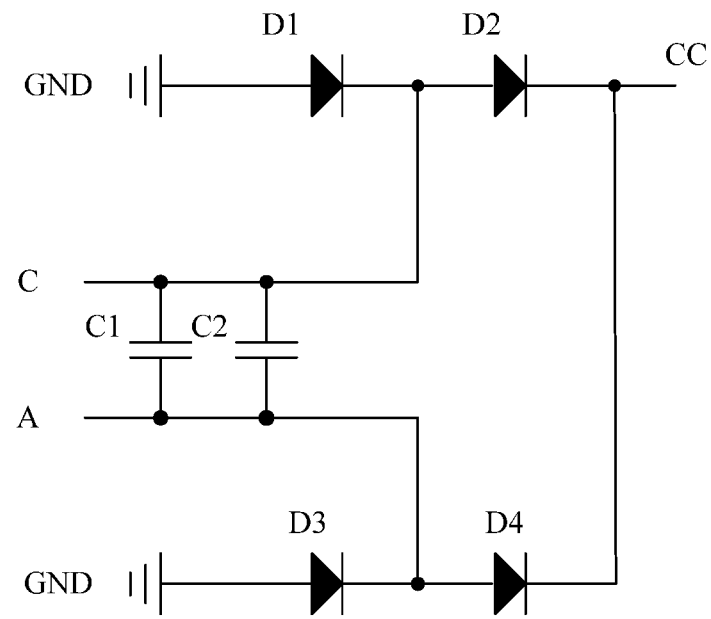
FIG. 11 shows a circuit diagram of a rectifying circuit according to Embodiment 1 of the present disclosure.

As shown in FIG. 11, the rectifying circuit 311 specifically includes a capacitance C1, a capacitance C2 and a rectifier bridge which consists of a diode D1, a diode D2, a diode D3 and a diode D4.

Figure 12:
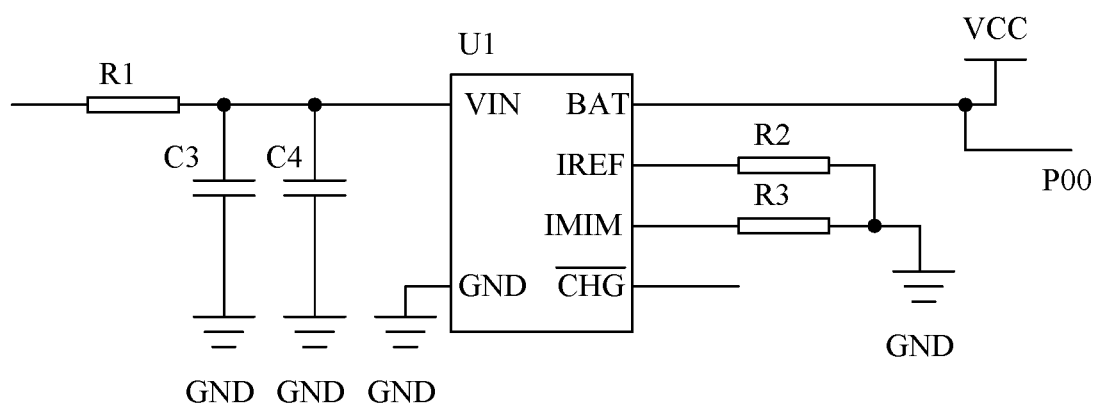
FIG. 12 shows a circuit diagram of a second voltage stabilizing circuit according to Embodiment 1 of the present disclosure.

As shown in FIG. 12, the second voltage stabilizing circuit 312 may include a low dropout regulator (LDO) U1, a resistance R1, a resistance R2, a resistance R3, a capacitance C3 and a capacitance C4; one end of the resistance R1 is connected to the rectifying circuit 311, the other end of the resistance R1 is connected to the VIN pin of the low dropout regulator U1; one end of the capacitance C3 is connected to the VIN pin of the low dropout regulator U1, and the other end thereof is connected to the ground; one end of the capacitance C4 is connected to the VIN pin of the low dropout regulator U1, the other end thereof is connected to the ground; one end of the resistance R2 is connected to the IREF of the low dropout regulator U1, and the other end thereof is connected to the ground; one end of the resistance R3 is connected to the IMIM of the low dropout regulator U1, and the other end thereof is connected to the ground; the BAT pin of the low dropout regulator U1 is made as an output end VCC of the signal converting module 15; the BAT pin of the low dropout regulator U1 is connected to the P00 pin of the chip U4. When the chip U4 detects that the P00 pin is at a high level, the visual card is determined to be in the field; when the chip U4 detects that the P00 pin is at a low level, the visual card is determined to be out of the field.

Furthermore, the second voltage stabilizing circuit 312 is connected to the power management module 13, specifically, the VCC end of the power management module 13 is connected to the second voltage stabilizing circuit 312, i.e., connected to the BAT pin of the low dropout regulator U1.

Figure 13:
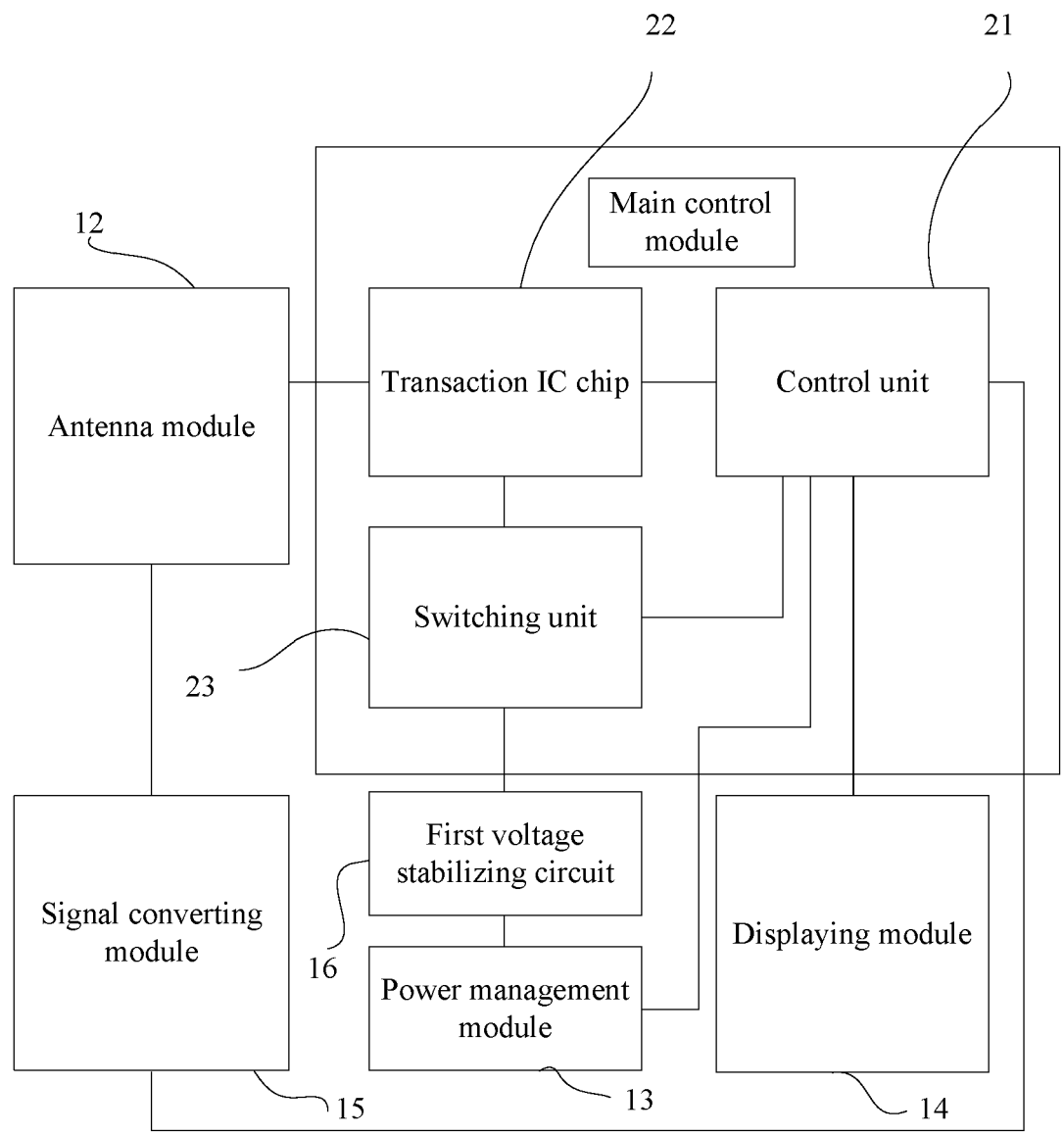
FIG. 13 shows a block diagram of a visual card according to Embodiment 1 of the present disclosure.

Furthermore, when a voltage output by the power management module 13 is not equal to an operating voltage of the transaction IC chip 22, as shown in FIG. 13, the visual card further includes a first voltage stabilizing circuit 16; for instance, the voltage output by the power management module 13 is 4V, the operating voltage of the transaction IC chip 22 is 3.3V; thus, the visual card further includes the first voltage stabilizing circuit 16; the first voltage stabilizing circuit 16, which lies between the switching unit 23 and the power management module 13, is configured to convert the voltage output by the power management module 13 into the operating voltage of the transaction IC chip 22.

Optionally, the first voltage stabilizing circuit may also lie between the switching unit 23 and the transaction chip 22.

Figure 14:
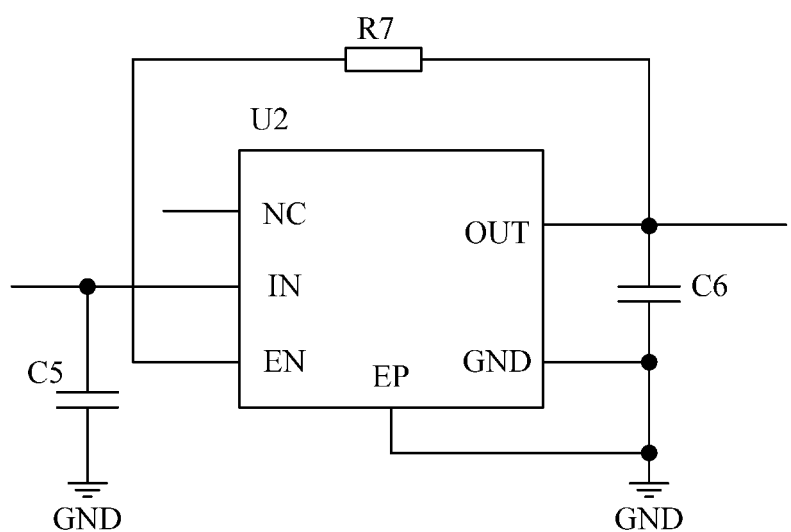
FIG. 14 shows a circuit diagram of a first voltage stabilizing circuit according to Embodiment 1 of the present disclosure.

As shown in FIG. 14, the first voltage stabilizing circuit 16 specifically includes a capacitance C5, a resistance R7, a capacitance C6 and a low dropout regulator U2; the IN pin of the low dropout regulator U2 is connected to the switching unit 23, i.e., connected to the drain of the PMOS transistor Q1; the IN pin of the low dropout regulator U2 is connected to the ground via the capacitance C5; one end of the capacitance C6 is connected to the OUT pin of the low dropout regulator U2, the other end is connected to the ground; both of the GND pin and the EP pin of the low dropout regulator U2 are connected to the ground; the IN pin of the low dropout regulator U2 is connected to the OUT pin of the low dropout regulator U2 via the resistance R7; meanwhile, the IN pin of the low dropout regulator U2 is connected to the EN pin; the OUT pin of the low dropout regulator U2 is connected to the pin VCC of the chip U3.

It should be noted that the control unit 21 and the transaction IC chip 22 can be integrated in one chip.

Furthermore, the visual card further includes a current limiting module which lies between the power management module 13 and the signal converting module 15.

Embodiment 2

Figure 15:
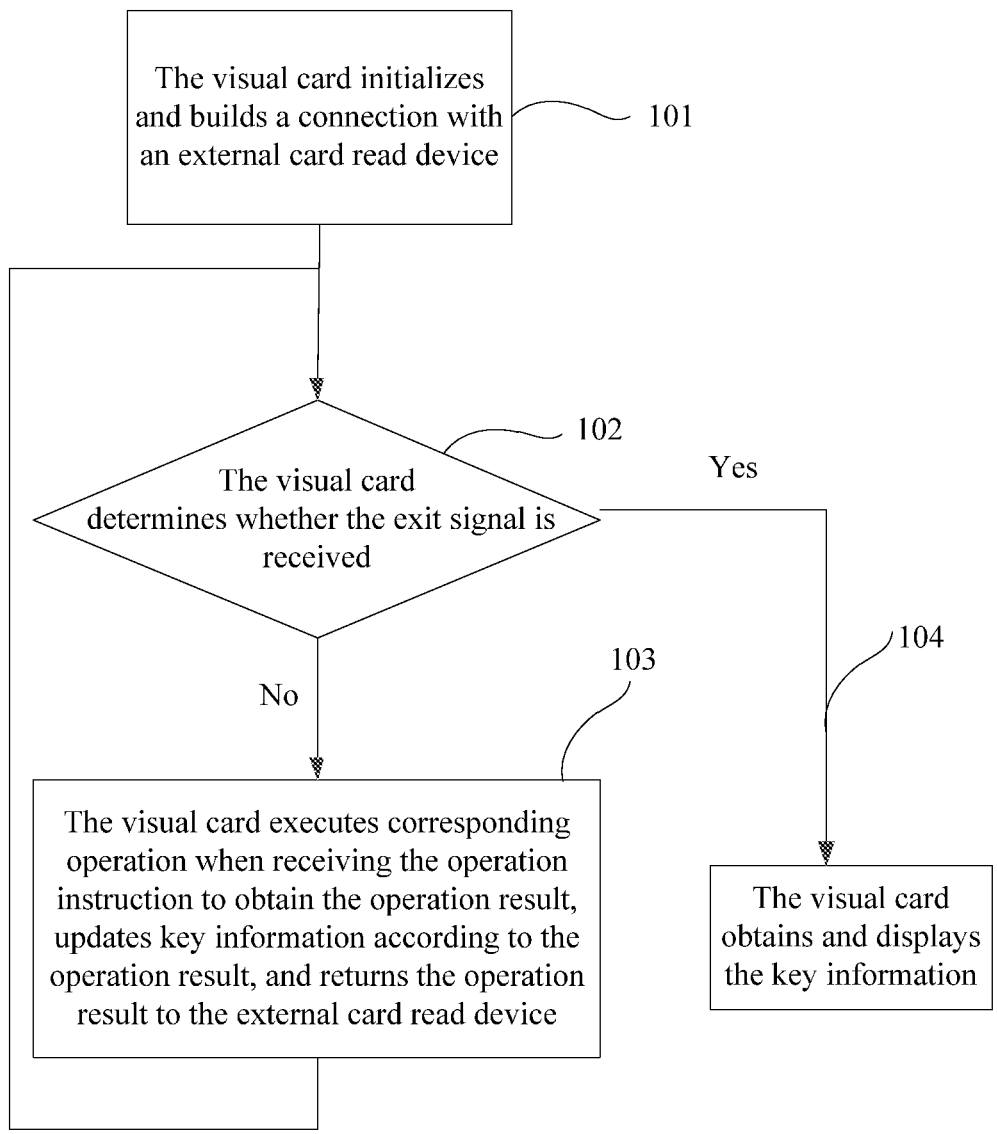
FIG. 15 shows a flowchart of an operating method for a visual card according to Embodiment 2 of the present disclosure.

This embodiment provides an operating method for a visual card, as shown in FIG. 15, the method specifically includes:

step 101: the visual card initializes and builds a connection with an external card read device.

Where the initialization of the visual card specifically includes: the attribute of each pin on the chip is initialized as an input or output, and a system clock is set.

Step 102: the visual card determines whether an exit signal is received, if yes, proceed to step 104; otherwise, proceed to step 103 when receiving an operation instruction;

Specifically, step 102 includes: the visual card detects whether a level of a test IO is at a low level, if yes, it is determined that the exit signal is monitored by the visual card; otherwise, it is determined that the exit signal is not monitored by the visual card.

Furthermore, in Embodiment 2, the visual card detects whether a level of the P00 pin is at a low level, if yes, it is determined that the exit signal is monitored by the visual card; otherwise, it is determined that the exit signal is not monitored by the visual card.

Step 103: the visual card executes a corresponding operation according to an operational instruction to obtain an operation result, updates key information according to the operation result, and returns the operation result to the external card read device; and returns to step 102;

For instance, when the external card read device sends a transaction instruction, the visual card executes a transaction operation and updates an e-cash balance.

For instance, when the external card read device sends a credit for load instruction, the visual card executes a credit for load operation and updates the e-cash balance.

Preferably, after the operation instruction sent by the external device is received by the visual card in step 102, before step 103, the method further includes: the visual card verifies the operation instruction, and sends an error code to the external card read device, returns to step 102 when the verification fails, and proceeds to step 103 when the verification passes.

Step 104: the visual card obtains and displays the key information.

Preferably, before step 104, the method further includes: the visual card clears up contents displayed on the screen.

Furthermore, when the visual card includes a control unit and a transaction IC chip, where the visual card obtains the key information specifically includes:

step 201: the control unit sends a reset signal to the transaction IC chip, and proceeds to step 202 when receiving a reset response returned from the transaction IC chip.

Where the control unit sends the reset signal to the transaction IC chip specifically includes: a reset IO, via which the control unit is connected to the transaction IC chip, is set to output a high level.

Step 202: the control unit determines whether the transaction IC chip is successfully reset according to the reset response, if yes, proceed to step 203; otherwise, the control unit reports an error, and the method ends.

Specifically, step 202 specifically includes: the control unit determines whether the first byte of the received reset response is 0X3B, if yes, the control unit determines that the transaction IC chip is reset successfully; otherwise, determines that the transaction IC chip is reset unsuccessfully, an error is reported and the method ends.

For instance, when the received reset response is 3B1F92006646530010031571FE0000816117, since the first byte is 0X3B, therefore, the transaction IC chip is reset successfully.

Step 203: the control unit sends an applet choosing instruction to the transaction IC chip, and receives response data returned from the transaction IC chip.

Specifically, the applet choosing instruction is 0X00A40000022F03.

Step 204: the control unit determines whether an applet is chosen successfully according to the response data, if yes, proceed to step 205; otherwise, reports an error, and the method ends.

Specifically, the control unit determines whether a flag of the response data is 0X9000, if yes, determines that the applet is chosen successful; otherwise, reports an error and the method ends.

Step 205: the control unit obtains the key information from the transaction IC chip.

In this embodiment, the control unit sends an instruction for obtaining an e-cash balance, which is specifically 0X805C000204, to the transaction IC chip, information about the e-cash balance received by the control unit from the transaction IC chip is 0X000063FF9000, the obtained data of preset bytes is 000063FF, which is converted into decimal 299.99 and is displayed.

It can be understand by those skilled in the art that all of the steps or part of the steps in the above embodiments can be implemented via a hardware related with program instructions which may be stored in a readable storage media of a computer, and the above steps in the embodiments are executed when the program is executed; the said storage media includes any sort of media which can store the program code, such as a read-only memory (ROM), a random access memory (RAM), a disk or a dish.

The above embodiments are preferable detailed description of embodiments, but the implementation of the present disclosure is not limited by the above embodiments, all changes to the technical solutions recited in the above embodiments, or substitutions to part of or all the technical features thereof can be made by those skilled in the art and shall be all included in the protection scope of the present disclosure.

What is claimed is:

1. A visual card, comprising: a main control module, an antenna module, a power management module, a displaying module and a signal converting module; wherein
the main control module is connected to the antenna module, the power management module, the displaying module and the signal converting module; the signal converting module is connected to the antenna module;
the main control module is configured to communicate with an external card read device via the antenna module, update and store key information; the main control module is further configured to monitor an exit signal according to an electronic signal input by the signal converting module; the main control module is further configured to obtain the key information when the exit signal is monitored and make the displaying module display the key information;
the antenna module is configured to be in mutual induction with the external card read device;
the signal converting module is configured to convert an electronic signal generated from the mutual induction of the antenna module, and transmit the converted electronic signal to the main control module; and
the power management module is configured to supply power for the main control module;
wherein the main control module comprises a control unit, a transaction integrated circuit (IC) chip and a switching unit;
the control unit is connected to the transaction IC chip, the switching unit, the power management module, the displaying module and the signal converting module; the control unit is configured to monitor the exit signal according to the electronic signal input by the signal converting module; the control unit is further configured to make the switching unit conductive when the exit signal is monitored so that the power management module supplies power for the transaction IC chip; the control unit is further configured to obtain the key information from the transaction IC chip when the exit signal is monitored, and make the displaying module display the key information; the power management module supplies power for the control unit;
the transaction IC chip, being further connected to the antenna module, is configured to communicate with the external card read device via the antenna module, update and store the key information; and
the switching unit is further connected to both of the transaction IC chip and the power management module, and the power management module supplies power for the transaction IC chip when the switching unit becomes conductive;
wherein the control unit specifically comprises a main control chip, an oscillating circuit, a reset circuit and a peripheral circuit;
the main control chip is connected to all of the transaction IC chip, the switching unit, the power management module, the displaying module, the signal converting module, the oscillating circuit, the reset circuit and the peripheral circuit.

2. The visual card according to claim 1, wherein the power management module is specifically a battery.

3. The visual card according to claim 1, wherein the signal converting module is also connected to the power management module, and the electronic signal converted by the signal converting module supplies power for the power management module.

4. The visual card according to claim 3, wherein the power management module is specifically a super capacitance.

5. The visual card according to claim 3, further comprising: a current limiting module which lies between the signal converting module and the power management module.

6. The visual card according to claim 1, wherein the signal converting module is connected to the main control module, specifically, connected to a test Input/Output (I/O) of the main control chip; wherein the power management module is connected to the main control module, specifically, connected to a Volt Current Condenser (VCC) pin of the main control chip.

7. The visual card according to claim 6, wherein the main control module being configured to monitor the exit signal according to the electronic signal input by the signal converting module is specifically configured to monitor the exit signal by monitoring a level change of the test I/O.

8. The visual card according to claim 1, further comprising a first voltage stabilizing circuit, wherein the first voltage stabilizing circuit lies between the switching unit and the transaction IC chip, or between the switching unit and the power management module.

9. The visual card according to claim 1, wherein the signal converting module specifically comprises: a rectifying circuit and a second voltage stabilizing circuit; wherein the rectifying circuit is connected to the antenna module and the second voltage stabilizing circuit, the second voltage stabilizing circuit is connected to the main control module.

10. The visual card according to claim 1, wherein the displaying module is an electronic paper (E-paper); the E-paper is connected to both of the power management module and the main control module when the E-paper is equipped with no drive IC; the E-paper connects to the main control module when the E-paper is equipped with a drive IC.

\* \* \* \* \*